United States Patent
Rose et al.

(10) Patent No.: US 6,901,324 B2
(45) Date of Patent: May 31, 2005

(54) SYSTEM AND METHOD FOR PREDICTIVE LOAD MANAGEMENT

(75) Inventors: Charles Earl Rose, Metamora, IL (US); Brian D. Kuras, Metamora, IL (US); Michael Edward Vanderham, E. Peoria, IL (US); Mustafa Kamil Guven, Dunlap, IL (US); Thomas Michael Sopko Jr., East Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 41 days.

(21) Appl. No.: 10/673,448

(22) Filed: Sep. 30, 2003

(65) Prior Publication Data

US 2005/0071066 A1 Mar. 31, 2005

(51) Int. Cl.[7] .................................................. G06F 7/00
(52) U.S. Cl. ........................................ 701/54; 701/51
(58) Field of Search ............................. 701/51, 54, 36

(56) References Cited

U.S. PATENT DOCUMENTS

| | | | |
|---|---|---|---|
| 4,745,901 A | * | 5/1988 | Reifenberger et al. .. 123/406.47 |
| 6,335,573 B1 | * | 1/2002 | Eguchi et al. ............ 290/40 C |
| 6,385,970 B1 | | 5/2002 | Kuras et al. |
| 6,424,902 B1 | | 7/2002 | Kuras |

OTHER PUBLICATIONS

"New Allison Transmissions in Terex Trucks," Terex Today, the Magazine for Terex Customers Around the World (undated).
Finck, "Tractor Time," Farm Journal, pp. 36–38, Sep. 2001.

* cited by examiner

*Primary Examiner*—Yonel Beaulieu
(74) *Attorney, Agent, or Firm*—Finnegan, Henderson, Farabow, Garrett & Dunner; Steven M Hanley

(57) ABSTRACT

A predictive load management system includes a power source operable to generate power output, the power source having a desired operating range. A transmission having a drive member is operably engaged with the power source. A control system is in communication with the power source and the transmission. The control system receives at least one input indicative of a load on the transmission and identifies a change in the load on the transmission based on the at least one input. The control system is further operable to determine a desired power output of the power source to account for the change in the load on the transmission. The control system modifies a performance characteristic of the power source to cause the power source to generate the desired power output when the change in the load on the transmission will result in the power source operating outside of the desired operating range.

20 Claims, 3 Drawing Sheets

SYSTEM AND METHOD FOR PREDICTIVE LOAD MANAGEMENT

TECHNICAL FIELD

This invention relates generally to a load management system and, more particularly, to a system and method for managing a predicted load on a power source.

BACKGROUND

Work machines such as, for example, wheel loaders, track type tractors, and other types of heavy machinery are used for a variety of tasks. These work machines include a power source, which may be, for example, an engine such as a diesel engine, a gasoline engine, or a natural gas engine, that provides the power required to complete these tasks. To efficiently perform these tasks, the work machines require a transmission that is capable of transmitting the torque generated by the engine over a wide range of speeds.

Typically, work machines use a continuously variable transmission (CVT) to convert engine torque to drive traction devices, such as wheels or tracks that propel the work machine. Continuously variable transmissions are capable of providing a desired output torque at any speed within its operating range by continuously changing the ratio of the transmission.

When an increase in torque is required at the same or faster output speed than previously demanded, a power increase demand is placed on the engine. Similarly, when less torque is required at the same or slower speed, a power decrease demand is transmitted to the engine. A change in the engine power demand is traditionally countered by an increase or decrease in fuel delivery to the engine. However, due to response delays of the various engine systems and the immediate demand for a change in power, engine speed may either droop under or over shoot a desired engine speed required to meet the output demand.

A problem common to many known CVT systems is that the operation of these devices may produce loads on the engine that are severe enough to cause engine "stalling" or "lugging", a.k.a, excessive engine speed droop. "Lugging" or "stalling" the engine may decrease the productivity and efficiency of the engine. Such CVT systems may also become unstable because the time required for the engine to respond to the changes in power demand can be much greater than the demand period.

Traditionally, power systems including an engine and a continuously variable transmission are controlled by measuring engine speed and changing the ratio of the transmission to keep the engine within a defined speed range. For example, U.S. Pat. No. 6,385,970 to Kuras et al. discloses a system that includes an engine, a hydraulic continuously variable transmission, and a control system in communication with the engine and transmission. The control system of the '970 patent is an under-speed control system for a hydro-mechanical drive system that is operable to sense engine speed and create an output speed signal. The control system is further operable to compare the engine speed signal to an under-speed value and produce an error signal. The error signal is used to produce a command signal that controls the transmission ratio so as to manage the load on the engine.

However, this type of control system may not prevent the engine from experiencing the inefficiencies associated with engine over-speed or under-speed conditions. Because the control system attempts to maintain the desired engine speed by measuring a deviation of the actual speed from a desired speed, the actual engine speed may not match the desired engine speed. By the time the control system determines that the engine speed has deviated from the desired speed, the engine may have already experienced these inefficiencies, even if the transmission adjusts the ratio to help the engine recover.

The present invention is directed towards overcoming one or more of the problems as set forth above.

SUMMARY OF THE INVENTION

One aspect of the present invention is directed to a predictive load management system. A power source is operable to generate a power output and has a desired operating range. A transmission having a drive member is operably engaged with the power source. A control system is in communication with the power source and the transmission. The control system receives at least one input indicative of a load on the transmission and identifies a change in the load on the transmission based on the at least one input. The control system is further operable to determine a desired power output of the power source to account for the change in the load on the transmission. The control system modifies a performance characteristic of the power source to cause the power source to generate the desired power output when the change in the load on the transmission will result in the power source operating outside of the desired operating range.

Another aspect of the present invention is directed to a method of managing a load on a power source. A transmission is driven with a power source, and a load on the transmission is sensed. A change in the load on the transmission is identified. A desired power output for the power source is determined that will account for the change in load on the transmission. A performance characteristic of the power source is changed to produce the desired power output when the change in the load on the transmission will result in the power source operating outside of the desired operating range.

DETAILED DESCRIPTION

Figure 1:
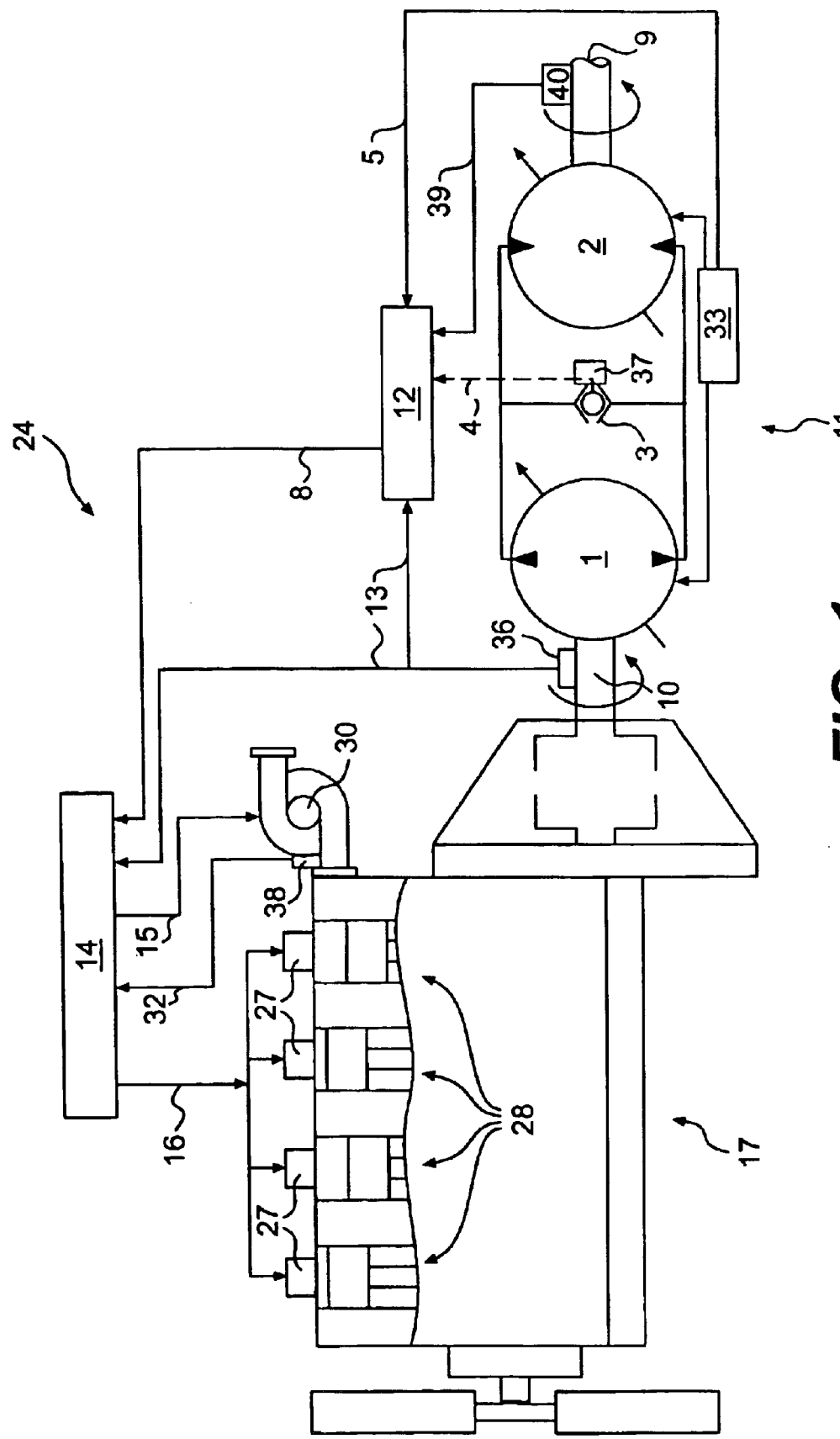
FIG. 1 is a schematic and diagrammatic representation of an exemplary embodiment of a predictive load management system in accordance with the present invention.
Figure 2:
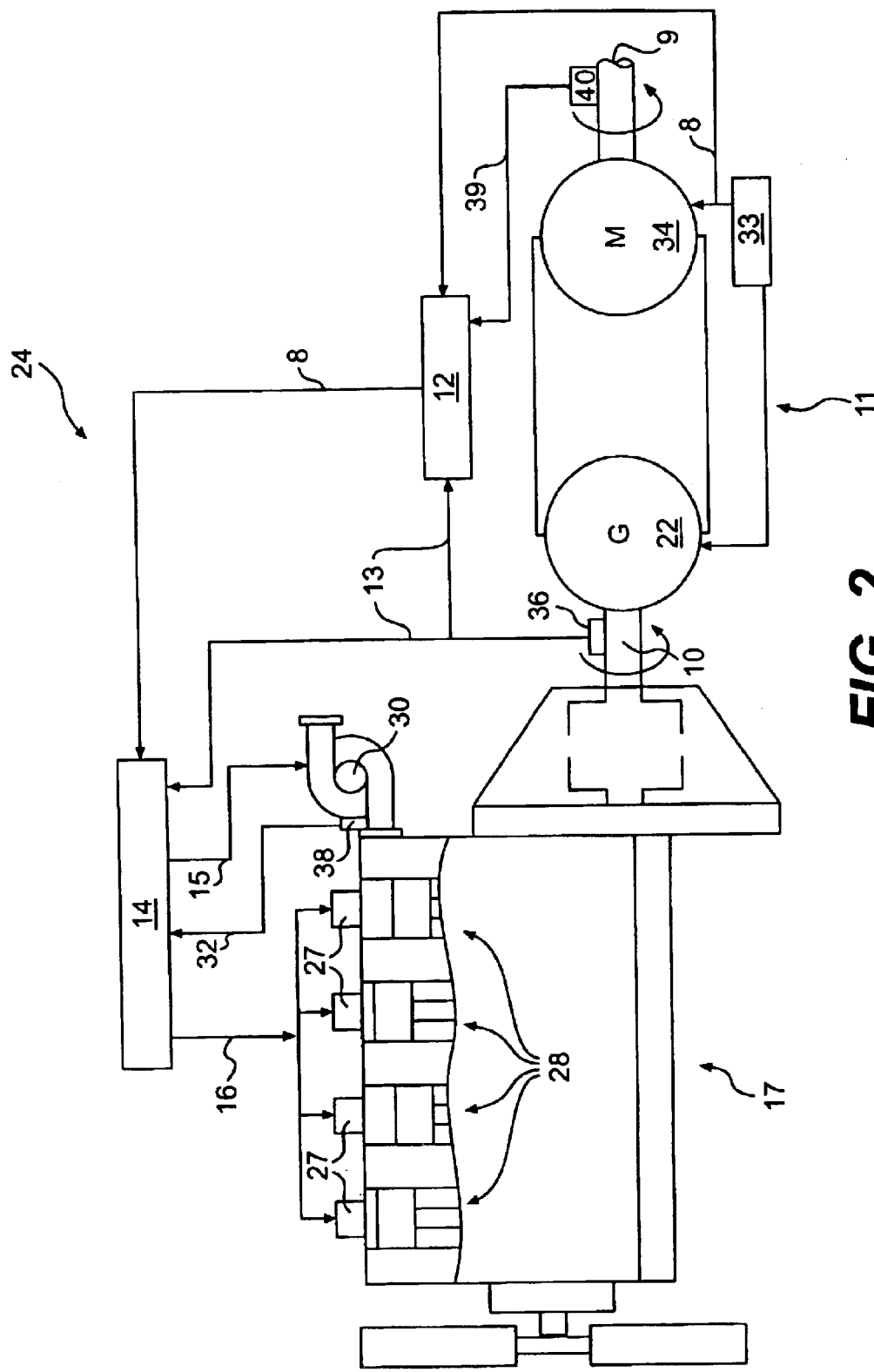
FIG. 2 is a schematic and diagrammatic representation of another exemplary embodiment of a predictive load management system in accordance with the present invention.

Exemplary embodiments of a predictive load management system are illustrated in FIGS. 1 and 2. The predictive load management system may be used, for example, with a power source 17 and a transmission 11. In the embodiments of FIGS. 1 and 2, the power source 17 is an engine, such as a turbo aspirated internal combustion engine. The engine may be a diesel engine, a gasoline engine, a natural gas engine, or any other engine readily apparent to one skilled in the art. The engine may also be naturally aspirated, supercharged, or have any other air induction system readily apparent to one skilled in the art. It is contemplated that the predictive load management system may be used with another type of power source such as, for example, a fuel cell.

As illustrated in FIG. 1, the power source 17 includes a plurality of combustion chambers 28. A fuel injector unit 27 is associated with each combustion chamber 28. In the illustrated embodiment, the power source 17 includes four combustion chambers 28 and four associated fuel injector units 27. One skilled in the art will readily recognize that power source 17 may include a greater or lesser number of combustion chambers 28 and that combustion chambers 28 may be disposed in an "in-line" configuration, a "V" configuration, or any other conventional configuration.

The power source 17 may have a desired operating range. For the purposes of this disclosure, the term "desired operating range" includes those speeds and torques at which the power source 17 experiences substantially stable and efficient operation. When operating outside the desired operating range, the power source 17 may experience unstable operation such as, for example, overspeed situations, underspeed situations, lugging, and/or stalling. Efficiency losses may also be experienced by the power source 17 when operating outside the desired operating range such as, for example, increased fuel consumption, increased exhaust emissions, increased power source temperatures, and/or decreased responsiveness.

In conventional systems, the time required to transfer a desired change in load from the transmission 11 to the engine 17 may result in the engine 17 experiencing unstable operation. The system of the present disclosure is adapted to decrease the amount of time required to transfer the change in load to the engine and thereby avoid the unstable operation. In this manner, the system of the present disclosure operates in advance of the timing of a conventional system.

An input drive member such as, for example, a countershaft 10, may connect the power source 17 to the transmission 11. The transmission 11 may also include an output driven member such as, for example, an output shaft 9. As described in greater detail below, the transmission 11 converts an input rotation of countershaft 10 into an output rotation of output shaft 9. In this manner, power generated by the power source 17 may be transmitted to the output shaft 9.

Transmission 11 may be, for example, a continuously variable transmission. The transmission may be any type of continuously variable transmission such as, for example, a hydraulic continuously variable transmission (as shown in FIG. 1), an electric continuously variable transmission (as shown in FIG. 2), or other configurations as would be apparent to one skilled in the art.

A continuously variable transmission generally consists of a driving element, a driven element, and a ratio controller 33. In the hydraulic continuously variable transmission 11 illustrated in FIG. 1, the driving element is a pump 1, such as a variable displacement pump, and the driven element is a motor 2, such as a variable displacement motor. In the electric continuously variable transmission 11 illustrated in FIG. 2, the driving element is an electric generator 22 and the driven element is an electric motor 34.

In the hydraulic continuously variable transmission 11 of FIG. 1, the ratio controller 33 may manipulate the displacement of the pump 1 and the motor 2 to thereby control the output rotation of output shaft 9. The motor 2 may be fluidly connected to the pump 1 by conduits that supply and return fluid to and from the pump 1 and motor 2, allowing the pump 1 to effectively drive the motor 2 by fluid pressure. The transmission 11 may also include a resolver 3, allowing for a measurement of a pressure differential between the two conduits of supply and return fluid. The pressure differential between the two conduits and/or the displacement of the motor 2 may be used to determine the transmission output torque.

The electric continuously variable transmission 11 of FIG. 2 may include an electrical circuit connecting the generator 22 to the electric motor 34. The generator 22 may be operated to drive the electric motor 34. The generator 22 and the electric motor 34 may be in communication via the ratio controller 33.

The ratio controller 33 controls the ratio of the transmission output speed to the transmission input speed. In the embodiments of FIGS. 1 and 2, the ratio controller 33 is in communication with both the driving element and the driven element and may adjust the ratio of the transmission output speed to the transmission input speed, as limited by the current power output of the power source 17. When both output torque and output speed increases are demanded of the transmission 11 a demand for increased power is transmitted to the power source 17. Likewise, when both output torque and output speed decreases are demanded of the transmission 11, a demand for decreased power is transmitted to the power source 17.

The ratio of transmission output speed to input speed of the hydraulic transmission 11 (as shown in FIG. 1) at a particular power source output power may be controlled by manipulating the displacement of the pump 1 and/or motor 2. As the work machine encounters a change in loading conditions such as, for example, changing from a high ground speed with a low load situation to a suddenly high load situation, the ratio controller 33 may shift the ratio of the transmission 11 from a high-speed output to a low speed output. When shifting from a high-speed output to a low speed output, the ratio controller 33 may decrease the flow of fluid supplied to the motor 2 by decreasing the displacement of the pump 1 to reduce the torque load or power load of the power source 17. The ratio controller 33 may also increase the displacement of the motor 2 to decrease the load on the power source 17.

As the ratio of the transmission 11 shifts to limit or reduce the load on the power source 17, the available ground speed may be limited. The result may be a drop in work machine ground speed. Likewise, if the work machine encounters a reduction in load, the ratio controller may increase the displacement of the pump 1 and may decrease the displacement of the motor 2 allowing for an increase in work machine ground speed and a reduction in the available torque.

The ratio of transmission output speed to input speed of the electric transmission (as shown in FIG. 2) at a particular power source output power may be controlled by manipulating the torque command signal 8 to the electric motor 34. As the work machine encounters a change in loading conditions such as, for example, changing from a high ground speed with a low load situation to a suddenly high load situation, the ratio controller 33 may alter the torque command signal to the electric motor 34 to produce additional torque. In turn, the electric motor 34 demands additional power capacity from the generator 22 in the form of additional current.

One or more sensors may be associated with the transmission 11. These sensors may be adapted to provide indications as to the operation of the transmission 11. For example, in the hydraulic transmission 11 of FIG. 1, a pressure sensor 37 may be adapted to provide a fluid pressure signal 4 from the resolver 3.

In addition, one or more sensors may be associated with the power source 17. The sensors may be adapted to provide relevant indications of the operation of the power source 17. For example, a power source sensor 36 may be adapted to sense power source speed and produce a power source speed signal 13. The power source sensor 36 may be, for example, in the form of a magnetic pick-up sensor adapted to produce a signal corresponding to the rotational speed of the power source 17. The power source sensor 36 may also be capable of determining the speed, angular position, and direction of rotation of the countershaft 10. In addition, an intake sensor 38 may be operable to sense the pressure of the charged air entering the power source cylinders 28 and to generate an appropriate intake air pressure signal 32.

The predictive load management system may include a control system 24 having a transmission controller 12 embodied in a microprocessor and a power source controller 14 embodied in a microprocessor. Numerous commercially available microprocessors can be adapted to perform the functions of the power source and transmission controllers 14, 12. It should be appreciated that the power source and the transmission controllers 14, 12 could readily be embodied in one single microprocessor without departing from the scope of the present disclosure.

In the embodiment of FIG. 1, the transmission controller 12 may be configured to receive inputs from the hydraulic transmission 11, including a displacement signal 5 from the ratio controller 33 and the fluid pressure signal 4 from the pressure sensor 37. Transmission controller 12 may use the displacement signal 5 and fluid pressure signal 4 to calculate transmission output torque and determine a change in demand torque.

In the embodiments of FIG. 2, the transmission controller 12 may be configured to receive inputs from the electric transmission 11. These inputs may include, for example, the torque command signal 8. A speed signal 39 from a speed sensor 40 on output shaft 9 or speed signal 13 from power source sensor 36, may be used together with the torque command signal 8 to determine a change in demand power.

The torque command signal 8 from the ratio controller 33 to the electric motor 34 may be used to measure or estimate the electric motor output torque because of the consistent relationship of actual motor output versus commanded motor output. Other methods of measuring output torque may be implemented such as, for example, measuring motor input voltage and current, measuring generator output voltage and current, and other methods as are known in the art.

The transmission controller 12 may be configured to transmit the torque command signal 8 to the power source controller 14.

The power source controller 14 may be configured to receive input from the transmission controller 12 that is indicative of transmission output torque and/or power demand. The power source controller 14 may also be adapted to receive operating parameters such as, for example, the power source speed signal 13, and the intake air pressure signal 32. The power source controller 14 may be configured to receive reference parameters, including fuel settings and air delivery requirements. The power source controller 14 may be further configured to process these input and reference signals and determine preparatory commands that actuate means for modifying performance characteristics of the power source 17 during a predictive time period when the change in load demand is transferred from the transmission 11 to the power source 17.

The predictive time period, for the purposes of this disclosure, is the period of time from when the transmission first identifies a desired change in load on the driven member of the transmission until the power source actually experiences the desired load change. For example, the transmission will identify a desired change in load on the driven member of the transmission. The driven member will transfer the desired change in load to the driving member. Likewise, the driving member will transmit the desired change in load to the power source. The power source performance will change to accommodate the new power level. The time associated with these load transfers is the predictive time period.

The power source controller 14 may adjust the performance of the power source 17 when the inputs received indicate that the load on the transmission has changed. The power source controller 14 may produce power source performance altering signals to increase or decrease the power output of the power source 17. In particular, the power source controller 14 may adjust the performance of a fuel injection system, an air induction system, or any other aspect of power source operation that may result in a change in the power output of the power source.

The power source controller 14 may adjust the operation of the fuel injection system to vary the power output of the power source. The power source controller 14 may generate and send a fuel delivery altering signal 16 to adjust the performance of the fuel injection system to control a fuel delivery rate, a fuel delivery timing, a fuel delivery pressure, and/or a fuel torque limit. These fuel delivery altering signals 16 may be produced in accordance with power source control maps such as, for example, rail pressure maps, timing maps, torque limit maps, etc., as are known in the art. Optionally, the actual power source performance may be regulated into correspondence with the desired performance using a proportional-integral-differential (PID) control loop. Alternatively, other control strategies such as proportional-integral control may be employed.

The fuel delivery altering signal 16 may be delivered to solenoid operated fuel injector units 27 associated with individual power source combustion chambers 28. The duration of the injection control signal corresponds to the on time of the solenoid, thereby controlling the duration for which the fuel injector unit 27 delivers fuel to an associated combustion chamber 28 during the combustion cycle. The solenoid operated fuel injector units 27 may be hydraulically actuated units, mechanically actuated units, or any other units known in the art.

The power source controller 14 may control the fuel delivery to the power source 17 based on a differential between a desired power source output required to meet a predicted load change and the current power output. In the exemplary predictive load management system, fuel delivery to the power source 17 may be changed during the predictive time period before the load is transferred from the transmission 11 to the power source 17 to bring the actual power source output to the desired power output in preparation for responding to the anticipated change in load demand. As a result, the power source controller 14 may change the fuel delivery based on the perceived power output required to reduce speed droop or overspeed associated with the coming change in load, while still preventing power source failure.

Changes in the fuel delivery to the power source 17 may be based on a differential between the actual intake air pressure and a desired intake air pressure required to minimize response time associated with the predicted load demand change. In the exemplary predictive load management system, fuel delivery to the power source may be changed during the predictive time period before the load is transferred from the transmission 11 to the power source 17 to bring the actual intake air pressure to the desired intake air pressure in preparation for responding to the anticipated change in load demand. As a result, the power source controller 14 may change the fuel delivery based on the perceived intake air pressure required to reduce response time associated with the coming change in load, while still preventing power source failure.

In addition, power source controller 14 may also produce signals altering air delivery characteristics directly. These air delivery altering signals 15, which cause a change in the intake air pressure, may be produced in accordance with power source control maps such as, for example, boost maps or other wastegate controlling maps, turbo compounding maps, turbo braking maps, or other maps as are known in the art.

The power source controller 14 may deliver the required air delivery command signals to a means for changing the intake air pressure. The means for changing the intake air pressure may include, for example, a turbo compounding system, a turbo braking system, and an exhaust gas wasting system, and others as are known in the art. In the exemplary predictive load management system, air delivery to the power source 17 may be changed during the predictive time period before the load is transferred from the transmission 11 to the power source 17 to bring the actual air delivery to the desired delivery in preparation for responding to the anticipated change in load. As a result, the power source controller 14 may change the intake air pressure based on the perceived pressure differential required to minimize response time associated with the anticipated change in load.

A turbocharger compounding system may include an additional power source (not shown). This additional source of power may be adapted to apply energy to the turbo system in addition to the normal exhaust flow directed to a turbo 30. The additional energy may be supplied by way of mechanical, electrical, hydraulic or pneumatic assistance.

The turbo compounding system may be used to increase the intake air pressure when the flow of exhaust from the power source is relatively low. For example, when demand is placed on the power source 17 to increase the load capacity, fuel delivery may be increased to the power source 17. However, for the fuel to combust efficiently, a sufficient supply of air is required. Turbo inertia prevents the turbo 30 from spinning up in speed immediately, thereby preventing an immediate sufficient supply of air and resulting in efficient combustion. The inefficient combustion results in an increase in exhaust temperature that eventually drives the turbo 30 to spin up in speed and produce the desired intake air pressure, but there is a lag associated with the turbo inertia. This lag in the air system causes a lag in the response of the power source 17. Turbo compounding reduces the lag time by applying the driving power required for the turbo 30 to generate the desired intake air pressure. When the turbo 30 supplies sufficient inlet air, the increased fuel supply is able to combust efficiently, thereby quickly providing the increased demand in power.

A turbo braking system may be used to apply resistance or load in a direction opposing turbo rotation. When a sudden demand for less power is applied to the power source 17, turbo inertia prevents the turbo 30 from immediately spinning down to a lower speed. Once again, the lag in the air system causes a lag in the response of the power source 17. Turbo braking speeds up the response time of the power source by effectively applying brakes to the air system, thereby limiting the intake air pressure.

A wastegating system may be used to exhaust combustion gases to the atmosphere before expansion in the turbo 30, essentially causing the combustion gasses to bypass the turbo 30. Similar to turbo braking, wastegating acts to slow the turbo down quicker than it normally would if all of the exhaust gases were allowed to enter the turbo 30 and drive its rotation. Wastegating improves the response time of the power source 17 by effectively removing the turbo driving force, thereby limiting the capacity of the turbo 30 to pressurize the intake air.

Figure 3:
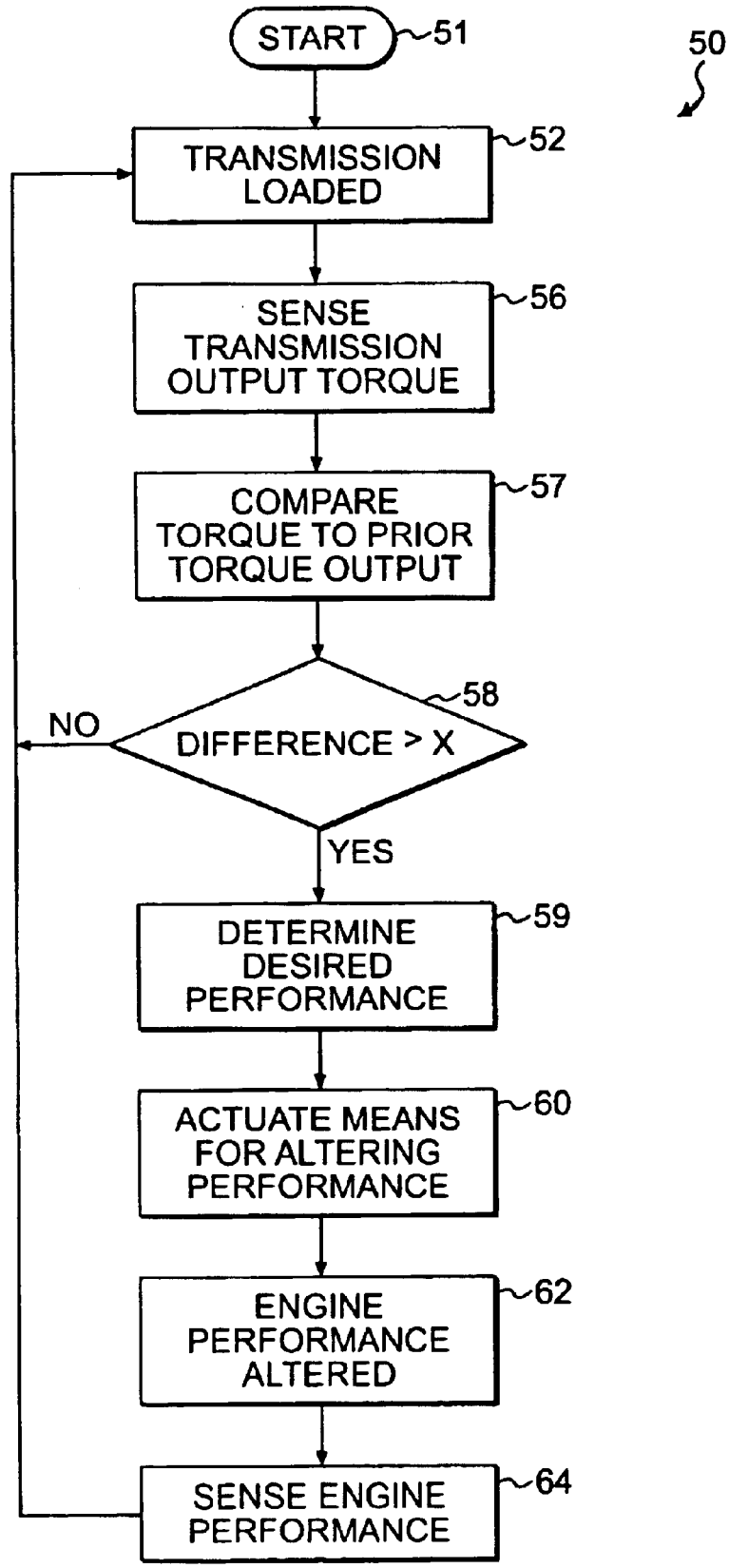
FIG. 3 is a flow chart illustrating an exemplary method of controlling a power source in accordance with the present invention.

A flow chart illustrating an exemplary method 50 of operating a predictive load management system is shown in FIG. 3. Control of the predictive load management system begins when a load has been placed on the engine (step 51). When transmission controller 12 determines that the transmission 11 has been loaded (step 52), the transmission controller 12 senses the torque and/or power applied to the transmission 11 (step 56).

Transmission controller 12 calculates the difference in magnitude between the sensed torque and a prior torque output value (step 57). The sensed torque now becomes the existing value for the next cycle of comparison. Transmission controller 12 compares the magnitude difference to a predetermined value (step 58). If it is determined that the magnitude difference is less than the predetermined value, no changes to the performance of power source 17 are made. Transmission controller 12 may continue to monitor the load on transmission 11. Acceptable values for the magnitude of demand load changes that result in acceptable speed changes may be determined by lab and/or field-testing.

If, however, the magnitude difference is equal to or greater than the predetermined value, transmission controller 12 may provide an indication of the load change to the power source controller 14. Power source controller 14 determines a change in a performance characteristic of the power source 17 to meet the anticipated load (step 59). For example, controller 14 may modify fuel delivery and/or intake air pressure to offset the anticipated load and minimize under or over-speed events.

Power source controller 14 may modify the fuel injection system to increase or decrease the power output of the power source 17. The power source controller 14 may determine a modified fuel torque limit, a modified timing, and/or a modified rail pressure based on the load condition of the transmission 11 and the desired power source speed and intake air pressure of the power source 17. The power source controller 14 then may determine an amount of fuel to be delivered to the power source 17 in response to the difference between current power source speed and intake air pressure and desired power source speed and intake air pressure, the modified timing, and/or the modified rail pressure, as limited by the modified fuel torque limit. It should be appreciated that the amount of fuel to be delivered to the power source 17 may also be limited by other factors such as, for example, a smoke rack limit to prevent emissions of black smoke that result from too rich of an air/fuel mixture.

Alternatively, power source controller 14 may modify the means for altering air delivery to change the power output of the power source. The power source controller 14 may determine an intake air pressure value based on the load condition of the transmission 11 and the anticipated affect of the transmission load on power source performance. In the case of an increase in load, the power source controller 14 may determine the increase in intake air pressure required to supply enough air for efficient combustion of the increasing fuel supply that will accompany the anticipated increase in load. The power source controller 14 may then cause additional energy to be directed to the turbine 30 (turbo compounding) in the direction of turbine rotation, thereby increasing the intake air pressure and the associated air delivery.

In the case of a decrease in load, the power source controller 14 may determine the amount of decrease in intake air pressure and the associated air delivery that will allow for efficient combustion of the decreasing fuel supply that will accompany the anticipated decrease in load. The power source controller 14 may then cause energy to be directed to the turbine 30 in a direction opposing turbine rotation (turbo braking), thereby decreasing turbo speed and the associated air delivery. Alternately, instead of turbo braking, exhaust gases may be vented to the atmosphere before entering the turbo 30 (wastegating), essentially bypassing the turbo 30, thereby decreasing turbo speed and the associated air delivery.

Once the power source performance has been altered (step 62), performance parameters of the power source 17 may be sensed and measured by power source controller 14 (step 64). The cycle may then begin again when the transmission 11 experiences a new change in load (step 52).

INDUSTRIAL APPLICABILITY

Based on information provided by transmission load sensors, the described predictive load management system may operate to minimize power source speed droop or overspeed and to reduce response time associated with a change in the transmission loading. Transmission sensors may detect a change in load that, under normal circumstances, might cause the power source 17 to operate outside of a desired operating range resulting in power source inefficiencies and possibly leading to unstable operation. Modifying the power source speed just prior to an anticipated disproportionate load change may act to minimize a speed droop or over-speed event. Likewise, changing air induction system characteristics just prior to a disproportionate load application may allow the power source 17 to respond quicker to the changing load.

For example, a sudden change in load may be communicated from output shaft 9 to the transmission 11. The change in load may be a demand for increased torque or a demand for less torque. Because the transmission 11 experiences the load changes before the power source 17, there is time for the transmission controller 12 to warn the power source controller 14 that the demand change is coming, giving the power source controller 14 time to prepare and respond.

Transmission controller 12 may detect an increase in load by sensing an increase in fluid pressure within the transmission 11 and comparing the pressure and a motor displacement in a hydraulic continuously variable transmission with reference pressure and displacement values. Similarly, in an electric continuously variable transmission 11, sensing the increased motor command torque and comparing it to reference torque values may detect the increase in load.

Transmission controller 12 may determine the magnitude of the increase in torque load and communicate the anticipated torque load to the power source controller 14. Power source controller 14 may then determine a preparatory action and communicate the preparatory action to the power source 17. Such preparatory actions for an increased torque load may include increasing the fuel delivery rate, advancing the fuel delivery timing, increasing the fuel injection pressure, or increasing the maximum fuel torque setting, all of which may result in an increase of the power source power and/or the intake air pressure. An increase in power source power will function to offset and minimize a predicted underspeed event. An increase in intake air pressure effectively increases air delivery. The increase in air delivery gives the power source 17 sufficient air for efficient combustion, allowing the power source 17 to respond quicker to the anticipated demand for increased power source output power. Intake air pressure and the associated air delivery may also be increased by direct means of turbocharger compounding.

Similarly, an anticipated decrease in power source load, as sensed in the transmission 11, may be communicated to the transmission controller 12. The transmission controller 12, in like manner as with the increase in load discussed previously, determines the torque decrease and communicates this demand change to the power source controller 14. Power source controller 14 may then determine and send preparatory commands to the power source 17. These preparatory commands may include decreasing the fuel delivery rate, retarding fuel delivery timing, decreasing fuel injection pressure, or decreasing the maximum fuel torque setting. Each of these preparatory actions causes a decrease in at least one of a power source power and an intake air pressure. A decrease in power source power may function to offset and minimize a predicted over-speed event. The decrease in intake air pressure may result in a decrease in the associated air delivery, giving the power source the ability to respond quicker to the demand for decreased airflow. Intake air pressure and the associated air delivery may also be reduced by direct methods of turbo braking and wastegating.

The present invention has wide applications in a variety of work machines including, for example, wheel loaders and track-type tractors. The present invention may be implemented into any work machine having a housing and a traction device that utilizes a continuously variable transmission to convert rotational speed of a power source into a driving speed of the traction device. The present invention may increase the overall efficiency of the work machine by allowing the work machine to operate a greater percent of the time within a desired operating range. The control system of the present invention may be implemented to an existing work machine without any major modifications or the addition of expensive hardware.

Other embodiments of the invention will be apparent to those skilled in the art from consideration of the specification and practice of the invention disclosed herein. It is intended that the specification and examples be considered as exemplary only, with a true scope of the invention being indicated by the following claims.

What is claimed is:

1. A predictive load management system comprising:
   a power source operable to generate a power output, the power source having a desired operating range;
   a transmission including a drive member operably engaged with the power source; and
   a control system in communication with the power source and the transmission, wherein the control system is operable to receive at least one input indicative of a load on the transmission, to identify a change in the load on the transmission based on the at least one input, to determine a desired power output of the power source to account for the change in the load on the transmission, and to modify a performance characteristic of the power source to cause the power source to generate the desired power output when the change in the load on the transmission will result in the power source operating outside of the desired operating range.

2. The predictive load management system of claim 1, wherein the control system comprises a first controller in communication with the power source and a second controller in communication with the transmission.

3. The predictive load management system of claim 1, further including a means for modifying the performance characteristic of the power source.

4. The predictive load management system of claim 1, wherein the power source includes:
   a turbocharger;
   a sensor operable to detect power source speed; and
   a sensor operable to detect intake air pressure.

5. The predictive load management system of claim 4, further including at least one of a turbocharger compounding system, a turbocharger braking system, and an exhaust gas wasting system.

6. The predictive load management system of claim 1, wherein the performance characteristic includes at least one of a power source power and an intake air pressure.

7. The predictive load management system of claim 1, further including a fuel injection system operable to manipulate at least one of a fuel delivery rate, a fuel delivery timing, a fuel delivery pressure, and a delivered fuel quantity.

8. The predictive load management system of claim 1, wherein the transmission is a hydraulic continuously variable transmission including:
   a variable displacement pump in communication with the control system;
   a variable displacement motor fluidly connected to the variable displacement pump, the variable displacement motor being in communication with the control system; and
   a sensor operatively disposed between the variable displacement pump and the variable displacement motor, the sensor operable to detect a change in a fluid pressure and to provide an indication of the change in fluid pressure to the control system.

9. The predictive load management system of claim 8, wherein the at least one input indicative of transmission loading includes at least one of:
   a motor displacement signal; and
   a transmission fluid pressure signal.

10. The predictive load management system of claim 1, wherein the transmission is an electric continuously variable transmission including:
    a generator in communication with the control system; and
    a motor in communication with the control system and with the generator.

11. The predictive load management system of claim 10, wherein the at least one input indicative of the load on the transmission includes a transmission command torque signal as communicated between the control system and the motor.

12. The predictive load management system of claim 1, wherein the power source is a diesel engine.

13. A method of controlling a power source comprising:
    driving a transmission with a power source, the power source having a desired operating range;
    sensing a load on the transmission;
    identifying a change in the load on the transmission;
    determining a desired power output for the power source to account for the change in load on the transmission; and
    changing a performance characteristic of the power source to produce the desired power output when the change in the load on the transmission will result in the power source operating outside of the desired operating range.

14. The method of claim 13, wherein sensing a load on the transmission includes:
    sensing a transmission fluid pressure differential between a supply conduit and a return conduit fluidly linking a pump and a motor in a hydraulic continuously variable transmission.

15. The method of claim 13, wherein sensing a load on the transmission includes sensing a transmission motor displacement.

16. The method of claim 13, wherein sensing a load on the transmission includes sensing a torque command communicated to an electric motor in an electric continuously variable transmission.

17. The method of claim 13, further including adjusting the performance of an air induction system associated with the power source to thereby adjust the power output of the power source.

18. The method of claim 13, further including adjusting the performance of a fuel injection system associated with the power source to thereby adjust the power output of the power source.

19. A work machine having a predictive load management system comprising:
    a housing;
    a traction device supporting the housing;
    a power source operable to generate a power output, the power source having a desired operating range;
    a transmission including a drive member operably engaged with the power source and adapted to transmit the power output of the power source to the traction device; and
    a control system in communication with the power source and the transmission, wherein the control system is operable to receive at least one input indicative of a load on the transmission, to identify a change in the load on the transmission based on the at least one input, to determine a desired power output of the power source to account for the change in the load on the transmission, and to modify a performance characteristic of the power source to cause the power source to generate desired power output when the change in the load on the transmission will result in the power source operating outside of the desired operating range.

20. The work machine of claim 19, further including a means for modifying the performance characteristic of the power source.

* * * * *